US010371094B2

(12) United States Patent
Rolt

(10) Patent No.: US 10,371,094 B2
(45) Date of Patent: Aug. 6, 2019

(54) NOZZLE ARRANGEMENT FOR A GAS TURBINE ENGINE

(71) Applicant: ROLLS-ROYCE PLC, London (GB)

(72) Inventor: Andrew Martin Rolt, Derby (GB)

(73) Assignee: ROLLS-ROYCE plc, London (GB)

( * ) Notice: Subject to any disclaimer, the term of this patent is extended or adjusted under 35 U.S.C. 154(b) by 517 days.

(21) Appl. No.: 14/789,643

(22) Filed: Jul. 1, 2015

(65) Prior Publication Data

US 2016/0010590 A1 Jan. 14, 2016

(30) Foreign Application Priority Data

Jul. 9, 2014 (GB) .................................. 1412189.1

(51) Int. Cl.
*F02K 1/08* (2006.01)
*F02K 1/09* (2006.01)
(Continued)

(52) U.S. Cl.
CPC ........... *F02K 3/025* (2013.01); *F01D 17/143* (2013.01); *F02C 3/04* (2013.01); *F02K 1/08* (2013.01); *F02K 1/09* (2013.01); *F02K 1/15* (2013.01); *F02K 1/48* (2013.01); *F02K 3/06* (2013.01); *F02K 3/075* (2013.01); *F05D 2220/323* (2013.01); *F05D 2250/311* (2013.01); *F05D 2250/41* (2013.01); *F05D 2260/20* (2013.01); *F05D 2260/213* (2013.01); *F05D 2260/57* (2013.01); *F05D 2260/96* (2013.01); *F05D 2270/101* (2013.01); *Y02T 50/675* (2013.01)

(58) Field of Classification Search
CPC ... F02K 3/025; F02K 1/08; F02K 1/09; F02K 1/15; F02K 3/075; F02C 3/04; F01D 17/14; F01D 17/143
USPC .................................................. 60/770, 771
See application file for complete search history.

(56) References Cited

U.S. PATENT DOCUMENTS 2,402,363 A * 6/1946 Bradbury ................. F02K 1/08 239/533.1
2,408,099 A * 9/1946 Sherman .................. F02K 1/08 239/265.19

(Continued)

FOREIGN PATENT DOCUMENTS

GB 1207194 A 9/1970
GB 2165892 A 4/1986

(Continued)

OTHER PUBLICATIONS

Jan. 27, 2015 Search Report issued in British Patent Application No. 1412189.1.

(Continued)

*Primary Examiner* — Lorne E Meade
*Assistant Examiner* — Eric W Linderman
(74) *Attorney, Agent, or Firm* — Oliff PLC

(57) ABSTRACT

A gas turbine engine comprising: a bypass duct having a bypass nozzle; an engine core having a core nozzle; and, a mixer duct defined by a mixer fairing and having a mixer nozzle, wherein the mixer duct is arranged to receive an airflow from the bypass duct through a mixer duct inlet and an airflow from the engine core, when in use, and the geometry of the mixer duct is selectively adjustable by moving the mixer fairing relative to the bypass duct and engine core in use.

18 Claims, 5 Drawing Sheets

(51) Int. Cl.

| | |
|---|---|
| ***F02K 3/02*** | (2006.01) |
| ***F01D 17/14*** | (2006.01) |
| ***F02K 1/15*** | (2006.01) |
| ***F02K 1/48*** | (2006.01) |
| ***F02K 3/075*** | (2006.01) |
| ***F02C 3/04*** | (2006.01) |
| ***F02K 3/06*** | (2006.01) |

(56) References Cited

U.S. PATENT DOCUMENTS 2,557,435 A * 6/1951 Imbert ...................... F02K 1/08 239/265.25
2,570,629 A * 10/1951 Anxionnaz ............. F02C 7/042 137/15.1
2,828,603 A * 4/1958 Laucher .................... F02K 1/08 239/265.27
3,049,873 A * 8/1962 Weeks, Jr. ................ F02K 1/09 239/127.3
3,441,218 A * 4/1969 Bucher ..................... F02K 1/08 239/265.13
3,575,259 A * 4/1971 Wilkinson .............. F02C 7/045 137/15.1
3,598,318 A * 8/1971 Schiel ....................... F02K 1/06 239/265.13
3,637,041 A 1/1972 Hilbig
3,721,389 A * 3/1973 MacKinnon .......... F02K 1/1207 181/222
3,756,026 A 9/1973 Timms et al.
3,841,091 A * 10/1974 Sargisson .................. F02C 3/13 60/224
4,026,472 A * 5/1977 Rabone ..................... F02K 1/08 239/127.3
4,039,146 A * 8/1977 Wagenknecht ........... F02K 1/06 239/265.25
4,043,508 A * 8/1977 Speir ......................... F02K 1/08 239/265.19
4,080,785 A * 3/1978 Koff ........................ F02K 3/075 415/69
4,244,294 A * 1/1981 Frignac ..................... F02K 1/08 102/374
4,285,194 A * 8/1981 Nash ....................... F02K 1/822 60/262
4,372,110 A * 2/1983 Fletcher .................. F02K 1/386 181/213
4,501,393 A * 2/1985 Klees .................... F02K 1/1207 181/215
4,527,388 A * 7/1985 Wallace, Jr. .............. F02K 1/09 239/265.19
4,592,508 A * 6/1986 Thornock ................. F02K 1/08 239/265.19
5,016,818 A * 5/1991 Nash ....................... F02K 1/002 239/127.1
5,211,007 A * 5/1993 Marvin ..................... F02K 1/15 60/204
5,261,227 A * 11/1993 Giffin, III ............. F01D 17/162 60/226.1
5,305,599 A * 4/1994 Marvin ..................... F02K 1/15 60/226.3
5,524,827 A * 6/1996 Znamensky ............ F02K 1/002 239/265.33
6,058,846 A * 5/2000 Boyd ...................... F02C 7/042 102/374
6,070,407 A * 6/2000 Newton .................. F02K 3/075 239/265.19
6,209,311 B1 * 4/2001 Itoh ........................... F02C 3/13 60/226.3
7,159,383 B2 * 1/2007 Barton ................... B64D 33/06 239/265.19
7,614,210 B2 * 11/2009 Powell ...................... F02K 1/08 60/226.1
7,762,057 B2 * 7/2010 Sloan ...................... F02K 1/386 60/226.1
8,205,430 B2 * 6/2012 Jain ........................ B64D 33/02 137/15.1
8,286,415 B2 * 10/2012 Kohlenberg .......... F01D 17/105 239/265.19
8,341,935 B2 * 1/2013 Marques ................ F02K 1/386 60/226.1
8,371,806 B2 * 2/2013 Kupratis ................ F02K 1/085 415/145
2005/0047942 A1 * 3/2005 Grffin, III ............... F02K 3/072 417/423.1
2007/0000232 A1 * 1/2007 Powell ...................... F02C 3/13 60/204
2007/0214795 A1 * 9/2007 Cooker ..................... F02K 1/06 60/772
2007/0256413 A1 * 11/2007 Marsal .................. F02M 26/05 60/605.2
2008/0022690 A1 * 1/2008 Chanez ..................... F02K 1/09 60/770
2008/0250770 A1 * 10/2008 Emprin .................. F02K 1/566 60/226.2
2008/0267762 A1 * 10/2008 Jain ........................ B64C 23/00 415/2.1
2008/0302083 A1 12/2008 Sloan et al.
2009/0094961 A1 * 4/2009 Stern ......................... F02K 1/09 60/226.3
2010/0050651 A1 * 3/2010 Dindar .................. B64D 33/04 60/770
2010/0077724 A1 * 4/2010 Migliaro, Jr. ............. F02K 1/08 60/226.3
2010/0154423 A1 * 6/2010 Olausson ................ F02K 1/383 60/725
2010/0162679 A1 * 7/2010 Khalid ...................... B64C 7/02 60/204
2011/0302907 A1 * 12/2011 Murphy .................... F02K 1/06 60/226.3
2012/0067025 A1 * 3/2012 Thies ...................... F02K 1/386 60/226.3
2012/0167549 A1 * 7/2012 Lariviere .................. F02C 9/20 60/204
2014/0037443 A1 * 2/2014 Khan ...................... F02K 3/075 415/211.2
2014/0238043 A1 * 8/2014 Sokhey ..................... F02K 1/36 60/805
2014/0245715 A1 * 9/2014 Vuillemin ................. F02K 1/34 60/226.1
2015/0113941 A1 * 4/2015 Buey ...................... F02K 3/077 60/204
2015/0128605 A1 * 5/2015 Sidelkovskly ............ F02C 9/18 60/772
2015/0345395 A1 * 12/2015 Moore .................... F02K 1/383 60/806
2018/0045142 A1 * 2/2018 Dierksmeier ............. F02K 1/08

FOREIGN PATENT DOCUMENTS

| | | | |
|---|---|---|---|
| GB | 2374121 | A | 10/2002 |
| GB | 2435076 | A | 8/2007 |
| WO | 2013/077924 | A2 | 5/2013 |

OTHER PUBLICATIONS

Nov. 11, 2015 Search Report issued in European Patent Application No. 15174804.

* cited by examiner

NOZZLE ARRANGEMENT FOR A GAS TURBINE ENGINE

TECHNICAL FIELD OF INVENTION

This invention relates to a nozzle arrangement for a gas turbine engine. In particular, the invention relates to a nozzle arrangement which is adjustable to provide different nozzle areas.

BACKGROUND OF INVENTION

Gas turbine engines are well known in the art. FIG. 1 shows a known ducted fan gas turbine engine 10 having a principal axis of rotation 11 and comprising, in axial flow series: an air intake 12, a propulsive fan 14, an intermediate pressure compressor 16, a high-pressure compressor 18, a combustor 20, a high-pressure turbine 22, an intermediate pressure turbine 24, a low-pressure turbine 26 and a core exhaust nozzle 28. A nacelle 30 generally surrounds the engine 10 and defines the intake 12, a bypass duct 32 and a bypass exhaust nozzle 34. It may also include a thrust reverser 36.

Air entering the intake 12 is accelerated by the fan 14 to produce a bypass flow and a core flow. The bypass flow travels down the bypass duct and exits the bypass exhaust nozzle to provide the majority of the propulsive thrust produced by the engine 10. The core flow enters in series the intermediate pressure compressor 16, high pressure compressor 18 and the combustor 20, where fuel is added to the compressed air and the mixture burned. The hot combustion products expand through and drive the high, intermediate and low-pressure turbines 22, 24, 26 before being exhausted through the nozzle 28 to provide additional propulsive thrust. The high, intermediate and low-pressure turbines 22, 24, 26 respectively drive the high and intermediate pressure compressors 18, 16 and the fan 14 by suitable interconnecting shafts.

If the bypass or cold nozzle 34 is upstream of the core exhaust or hot nozzle 28 then the engine may be referred to as having separate jets. If the bypass exhaust nozzle 34 extends aft of the core exhaust nozzle 28 and encloses it, then the engine 10 is said to have a mixed exhaust. In that case the bypass or final nozzle is often referred to as a mixed or common nozzle.

Variable area mixed flow exhaust nozzles are widely used on military turbofan engines. Most variable area cold nozzle designs work by varying the outside diameter of the nozzle, but some designs change the inside diameter of the nozzle by means of a variable geometry afterbody as described for example in the U.S. Pat. No. 3,756,026.

The benefit of having a variable area cold nozzle is for controlling the working line of the fan for improved fan efficiency, surge margin and operability particularly in turbofan engines with low pressure ratio fans or reheat systems.

The working line is the locus of fan pressure ratio plotted against fan inlet non-dimensional flow (or mass flow corrected to standard pressure and temperature) for normal steady-state engine operation. At any non-dimensional inlet flow there is an optimum fan pressure ratio for highest efficiency and an upper limit for fan pressure ratio, beyond which the streamline flow through the fan will break down and the fan will surge. At all conditions the non-dimensional flows are determined by the effective fan nozzle exit area and nozzle pressure ratio.

When the fan pressure ratio is high or the engine is flying at high subsonic (or supersonic) Mach number, the final nozzle will have sonic or near sonic flow and is said to be choked. Under these conditions the fan will have a steep working line which will tend to track the locus of peak fan efficiency and run parallel to the surge line as power is varied, providing a safe margin with respect to surge. However, if the fan pressure ratio and the airspeed are lower, the flow through the nozzle will be subsonic and the non-dimensional flow through the nozzle will reduce with reducing fan power and fan and nozzle pressure ratios.

In this case the non-dimensional mass flow at entry to the fan will reduce more rapidly as fan speed and power are reduced and so the fan working line will be flatter. This means that the working line no longer follows the locus of peak efficiency and could be too high at low power conditions where the fan may now surge. Conversely, if a larger fan exit nozzle area is provided, the fan efficiency will suffer when the engine is operated at high airspeeds, such as at cruise at altitude, because here the working line will be too low. These problems become more severe as a fan is designed for lower pressure ratios, below about 1.45, and in this case a variable area nozzle can significantly improve fan efficiency at cruise and top of climb conditions.

An alternative design using a mixed-flow final nozzle of fixed geometry to improve the fan working line is used on several Rolls-Royce engines such as the Trent 700. In this arrangement the core exhaust and the fan bypass section exhaust are admitted into a common duct and share a common final exhaust nozzle. As the engine is throttled back the core exhaust mass flow reduces more rapidly than the fan bypass section mass flow and occupies a smaller proportion of the final nozzle cross-section, increasing the effective flow area available to the fan bypass flow. This arrangement is helpful, but ultimately not as effective as a variable area nozzle, because it mostly only responds to changes in fan pressure ratio or power level and not to changes in flight speed.

U.S. Pat. No. 6,070,407 describes a bypass duct of a gas turbine engine which is provided with a secondary duct at least partly within the downstream end of the bypass duct. The secondary duct is provided with means such as flaps whereby the airflow therethrough may be varied to suit the flight requirements of an associated aircraft, in a way which will control the maximum diameter of the free stream tube airflow at the intake of the engine, thus effectively reducing the frontal area of the fan duct, and therefore, drag.

A similar arrangement to that described in U.S. Pat. No. 6,070,407 is described in US2008302083, but for an entirely separate purpose. Here, the described aircraft has at least one turbofan engine assembly having a shrouded core engine, a short outer nacelle surrounding a fan and a forward portion of the core engine, and a fan exhaust duct through the nacelle. A mixer duct shell is positioned coaxially with the engine shroud and extends forwardly into the fan duct to provide an interstitial mixer duct between the mixer duct shell and the core engine shroud. The aft portion of the mixer duct shell extends over a turbine exhaust frame, an attached mixer (if included), and a tail cone exhaust plug. The mixer duct shell is described as reducing noise and plume exhaust heat radiated from aircraft turbofan engines.

A forward portion of the shell in US'083 is affixed to the core engine shroud by a plurality of circumferentially spaced and aerodynamically tailored radial pillars. An aft portion of the shell may be moved in an aft-ward direction along a pillar slide with weight supported on a sliding track attached to the engine pylon sidewall. Moving the aft portion provides access to underlying structure and is carried out only whilst the engine is not operating. When operating, the aft portion is locked to the core engine in a fixed relation.

GB1207194 describes a jet engine arranged for the suppression of jet sound and comprises nacelle surrounding a duct for exhaust gas flow; flaps positioned to form a converging section adjacent the end of the duct; blow-in doors pivotally mounted at the end of the nacelle arranged to move inwardly; an annular body positioned rearwardly of the pod or nacelle with the inner surface of the body forming an inlet passageway with each blow-in door, and turbulence inducing means to produce a shear layer surrounding the expanding exhaust flow.

The present invention seeks to provide an improved variable area nozzle arrangement for a gas turbine engine.

STATEMENTS OF INVENTION

In a first aspect, the present invention provides a gas turbine engine comprising: a bypass duct having a bypass nozzle; an engine core having a core nozzle; and, a mixer duct having a mixer duct inlet and a mixer nozzle defined by a mixer fairing which is movably mounted to the engine and, wherein the mixer duct is arranged to receive an airflow from the bypass duct through the mixer duct inlet and an airflow from the engine core, when in use, and the geometry of the mixer duct is selectively adjustable by moving the mixer fairing relative to the bypass duct and engine core in use.

The mixer fairing may be moved between a first position and second position which simultaneously alters one or more of: an output flow area of the bypass nozzle, an output flow area of the mixer nozzle, and, a throat area of the mixer duct inlet. Moving the mixer fairing between the first and second position may simultaneously alter all of: the output flow area of the bypass nozzle, the output flow area of the mixer nozzle, and, the throat area of the mixer duct inlet.

Moving the mixer fairing between a first and second position may alter the output flow area of the mixer nozzle and moving the mixer fairing between a second and third position may alter the output flow area of the bypass nozzle. Moving the mixer fairing between the second and third positions may additionally alter the mixer duct inlet flow area. A portion of radially outer wall of the mixer fairing downstream of the leading edge may be substantially parallel to the axis of movement such that moving the mixer fairing between a first and second position alters the output flow area of the mixer nozzle and moving the mixer fairing between a second and third position alters the output flow area of the bypass nozzle and mixer nozzle.

The mixer fairing may be axially translatable relative to the principal axis of the gas turbine engine so as to alter the geometry of the mixer duct.

The gas turbine engine may further comprise a tail cone. The position of the tail cone may be selectively adjustable relative to the engine core. The tail cone may be movable in an axial direction relative to the principal axis of the engine. The tail cone may be mounted to the engine core. The mounting may be telescopic.

The position of the tail cone may be selectively adjustable independently of the mixer fairing. Adjusting the tail cone may alter the output flow area of the mixer nozzle only.

The mixer duct fairing may be substantially annular and generally convergent towards the principal rotational axis of the gas turbine engine.

The engine core nozzle may exit directly into the mixer duct. Thus, the engine core nozzle may be radially inboard of the mixer fairing.

The leading edge of the mixer fairing may be at least partially located within the bypass duct in the first and second positions.

Either or both of the mixer fairing and the trailing edge of the core fairing may include lobes to aid mixing of the engine core airflow and bypass airflow.

The mixer fairing and tail cone may be configured to move simultaneously. The mixer fairing and tail cone may be movable at different relative speeds. The simultaneous adjustment of the mixer fairing and tail cone may be geared.

The mixer fairing may be mounted to the gas turbine engine via the tail cone. Alternatively or additionally, the mixer fairing is mounted on a pylon which is attached to the wing or airframe of an aircraft.

A portion of the mixer duct may be defined by the tail cone and the mixer duct fairing which may be arranged to have a chute therebetween. The minimum flow area of chute may be adjustable with the movement of the mixer fairing.

The mixer fairing may include a heat exchanger.

The gas turbine engine may further comprise a thrust reverser having at least one door which is operable to substantially block the bypass duct in a thrust reversing operation. The door may include at least one aperture in an upstream flow path relative to the leading edge of the mixer fairing such that a leading edge of the mixer fairing is provided with a cooling air flow when the thrust reverser door is deployed.

The gas turbine engine may further comprise a thrust measurement system and at least one sensor operably connected to the thrust measurement system. The sensor is configured to provide the system with a signal which is representative of the position of the mixer fairing and the thrust system determines the engine thrust using the position of the mixer fairing. It will be appreciated that the thrust measurement system may receive other sensor inputs as known in the art in order to determine the engine thrust. Alternatively, or in addition, the thrust measurement system may use the commanded position of the mixer fairing together with other inputs to determine the thrust level of the engine.

The gas turbine engine may further comprise a tail cone position sensor. The thrust measurement system may determine the engine thrust using the position of either or both the mixer fairing and tail cone. It will be appreciated that the thrust measurement system may receive other sensor inputs as known in the art in order to determine the engine thrust. Alternatively, or in addition, the thrust measurement system may use the commanded position of the mixer fairing, or the tail cone, or both, together with other inputs to determine the thrust level of the engine.

The thrust measurement system may provide an indication of the engine thrust to the flight deck instrumentation, or to a flight management system, or as feedback to the engine control system, or to any combination of these systems. The thrust measurement processor may be integrated into either or both of the flight management system and the engine control system.

In a second aspect, the present invention provides a method of operating a gas turbine engine, the gas turbine having a bypass duct having a bypass nozzle; an engine core having a core nozzle; and, a mixer duct defined by a mixer fairing and having a mixer nozzle, wherein the mixer duct is arranged to receive an airflow from the bypass duct through a mixer duct inlet and an airflow from the engine core, when in use, and the geometry of the mixer duct is selectively adjustable by moving the mixer fairing relative to the bypass duct and engine core, the method comprising the steps of:

monitoring at least one operating condition of the gas turbine engine; and, adjusting the position of the mixer fairing from a first position to a second position relative to the bypass duct and engine core in response to the monitored engine condition.

Adjusting the position of the mixer fairing may alter one or more of: an output flow area of the bypass nozzle, an output flow area of the mixer nozzle, and, a throat area of the mixer duct inlet.

The method of the second aspect may further comprise adjusting the position of the mixer fairing from the first position to the second position in which the output flow area of the bypass nozzle is substantially the same, and between the second position and a third position so as to alter the output flow area of the bypass nozzle.

The gas turbine engine may include a tail cone, wherein the position of the tail cone is selectively adjustable relative to the engine core in which case the method may further comprise the step of: moving the tail cone relative to the engine core.

The method of the second aspect may further comprise a thrust measurement system and at least one sensor operably connected to the thrust measurement system, wherein the sensor is configured to provide the thrust measurement system with a signal which is representative of the position of the mixer fairing and the thrust measurement system is configured to determine the engine thrust using the position of the mixer fairing together with other sensor inputs.

The method of the second aspect may further comprise a thrust reverser having at least one door which is operable to substantially block the bypass duct in a thrust reversing operation, wherein the door includes at least one aperture in an upstream flow path relative to the leading edge of the mixer fairing such that a leading edge of the mixer fairing is provided with a cooling air flow when the thrust reverser door is deployed, the method comprising the steps of: deploying the thrust reverser door to a deployed position; moving the mixer fairing to an aftmost position.

The method may further comprise the step of moving the tail cone to a foremost position.

The following drawings are provided to help describe the invention.

DETAILED DESCRIPTION OF INVENTION

Figure 1:
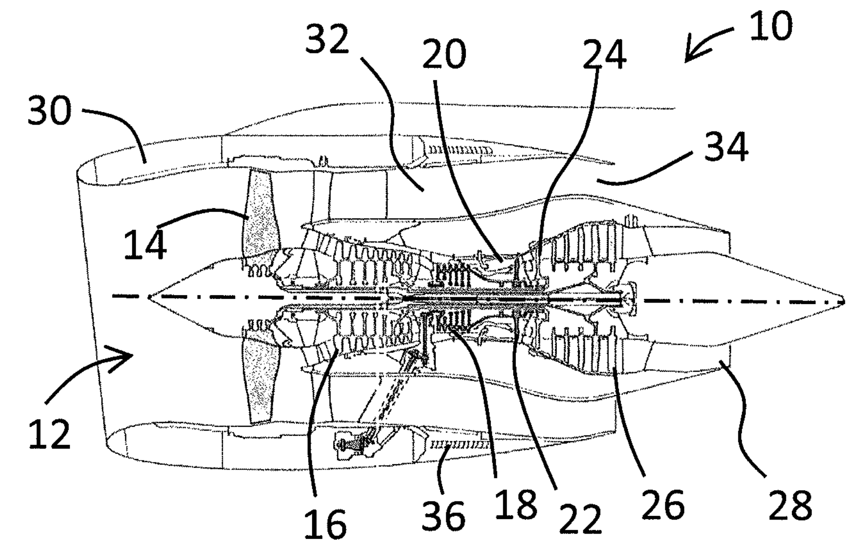
FIG. 1 shows a schematic cross-section through a prior-art ducted fan gas turbine engine.
Figure 2:
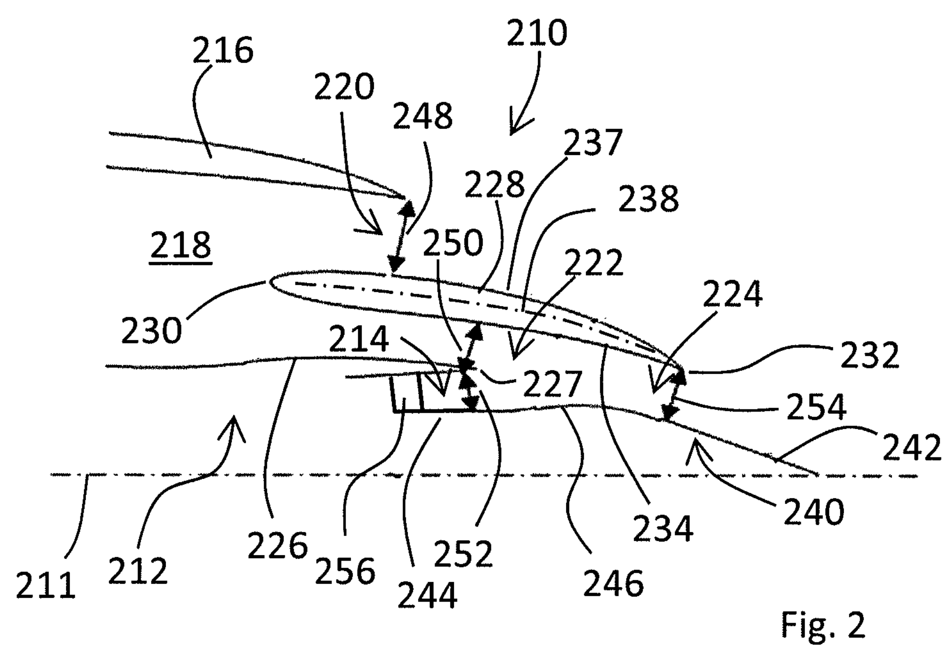
FIG. 2 shows a schematic partial cross-section through a gas turbine engine according to the present invention.

FIG. 2 shows a partial cross section of a gas turbine engine 210 according to the present invention. The gas turbine is similar to the prior art gas turbine engine 10 shown in FIG. 1 in that it includes an engine core 212 having a core nozzle 214 and a nacelle 216 defining a bypass duct 218 which terminates in a bypass nozzle 220. The basic operating principle is the same as that of the engine described above in relation to FIG. 1 in that an air flow is created in the bypass duct 218 and exhausted out of the bypass nozzle 220, and hot gases from the engine core 212 are exhausted from the core nozzle 214.

In addition to the prior art engine, there is also included a mixer duct 222 having a mixer nozzle 224. The mixer duct 222 is configured to receive airflows from the bypass duct 218 and from the engine core nozzle 214. The two streams of air are mixed within the mixer duct 222 and exhausted via the mixer nozzle 224 to provide propulsive thrust. The nozzles are substantially axi-symmetric about the principal axis 211 of the engine with the exception of a support structure which is described in more detail below.

The mixer duct 222 is an annular channel defined by a portion 246 of the core exhaust nozzle plug 240 and the inner annulus 234 of the mixer fairing 228. The mixer fairing 228 includes a relatively broad leading edge 230 and a fine trailing edge 232 with radially inner 234 and outer 237 walls extending therebetween so as to define an aerofoil-like shape in the cross section. This shape has a curved longitudinal axis 238 defined between the leading and trailing edges, which is generally convergent towards the centre line 211 of the engine 210 in the flow direction. In other words, the trailing edge 232 of the mixer annulus is radially inwards of the leading edge 230 with respect to the principal axis 211 of the engine.

The leading edge 230 of the mixer fairing 228 is located upstream of the bypass nozzle 220 such that the mixer fairing 228 is located partially within the bypass duct 218. The trailing edge 232 is downstream of the bypass nozzle 220 and is held in a radially spaced relation from a convergent trailing portion 242 of a telescopic tail-cone 240 which is located at the rear of the engine core 212 (and described further below). The space between the trailing edge 232 of the mixer fairing 228 and the tail-cone 240 defines the mixer nozzle 224 from which the mixed bypass air and core exhaust gas is exhausted to provide a propulsive thrust.

Figure 3:
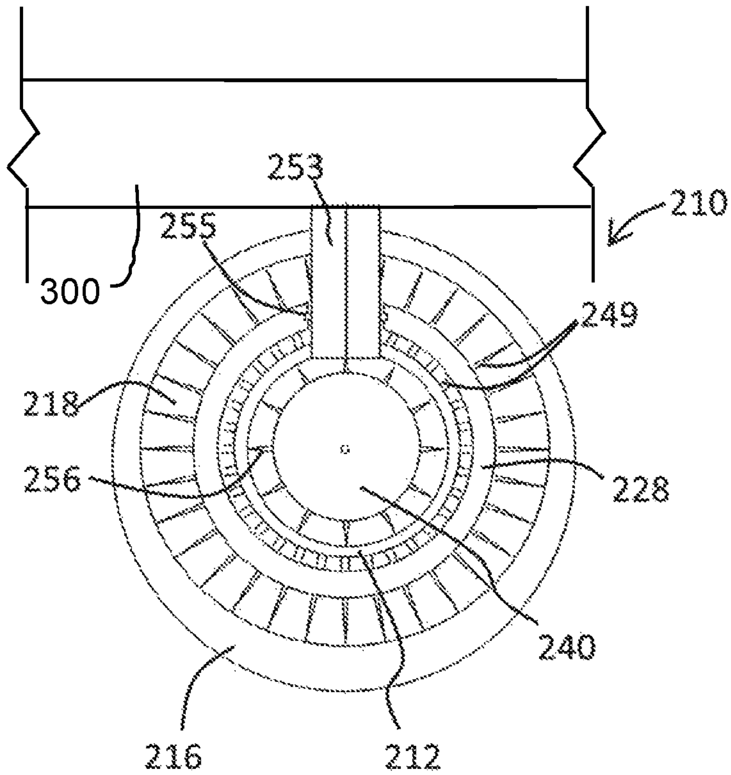
FIG. 3 shows a schematic view from aft on to an engine similar to that shown in FIG. 2.

The mixer fairing 228 is mounted to the engine 210 such that it can be axially translated between a first position and a second position relative to the nacelle 216 and engine core 212. FIG. 3 shows a view from aft of an engine 210 according to one embodiment in which similar parts have similar reference numerals to those shown in FIG. 2. Thus there is shown a nacelle 216, an engine core 212 having radially extending fan outlet guide vanes 249 in the bypass duct 216 located towards the front of the engine 210, but to the rear of the fan rotor (not shown), the mixer fairing 228, the tail-cone cone 240 and turbine outlet guide vanes 256.

The mixer fairing 228 is substantially axi-symmetric with the exception of a portion which meets a splitter in the form of a pylon 253 which is suspended from the underside of a wing or airframe 300 of the aircraft and carries the weight of the engine. The mixer fairing 228 is mounted to the pylon 253 via mounting rails 255 through which, or parallel to which, an actuating force can be provided to translate the mixer fairing 228.

The telescopic tail-cone 240 can be translated from a first position to a second position, thereby adjusting the mixer nozzle output flow area. The tail-cone 240 includes a first portion which is generally cylindrical and which is snugly received within a corresponding passageway in the rear of the engine core. The first portion is attached to a second, diverging portion which in turn connects to a third portion which converges on the centreline of the engine and is the portion which defines the mixer duct nozzle 224.

The axially translating tail-cone 240 can be an axi-symmetric design which is mounted on an internal structure cantilevered from the turbine aft bearing support structure or frame.

The axially translating mixer fairing 228 and the translating tail-cone 240 may be deployed by various actuator types as known in the art such as those used for deploying aero engine thrust reverser doors and cascades. These actuator types include, but are not limited to, hydraulic or pneumatic rams or motors or electric motors acting through screw-jacks. As will be appreciated, the actuation system will be designed either to fail fixed, or to fail safe by slowly retracting so that cold nozzle areas are maximised and the risk that the fan will surge is minimised.

The relationship between the nacelle 216, mixer fairing 228, engine core fairing 226 and tail-cone 240 defines four minimum flow areas. The first is the bypass nozzle flow area 248 which is defined between the radially outer wall 237 of the mixer fairing 228 and an inner wall of the nacelle 216. The second is the mixer cold throat area 250 which is defined between the trailing edge of the core fairing 226 and the radially inner wall 234 of the mixer fairing 228. The third is the core nozzle flow area 252 which is defined between the trailing edge 227 of the core fairing 226 and the hub extension 244 of the turbine outlet guide vane assembly 256 at the aft end of the core 212. The fourth is mixer duct nozzle flow area 254 which is defined between the trailing edge 232 of the mixer fairing 228 and a convergent portion 242 of the tail-cone 240.

In use, either or both of the tail-cone 240 and mixer fairing 228 can be moved to a plurality of different positions so as to vary the minimum flow areas of the bypass nozzle 220, mixer cold throat area 250, and mixer duct nozzle flow area 254. The core nozzle flow area 252 is fixed in the described embodiment, but it will be appreciated that there may be examples in which this is not the case. These two degrees of freedom enable the overall nozzle area and the mixer area ratio to be optimised independently for each flight condition. In this way the ratio of hot mixed jet and cold jet velocities can also be optimised at all conditions to maximise propulsive or Froud efficiency, or to minimise noise, or one or both at different flight conditions.

Figure 4:
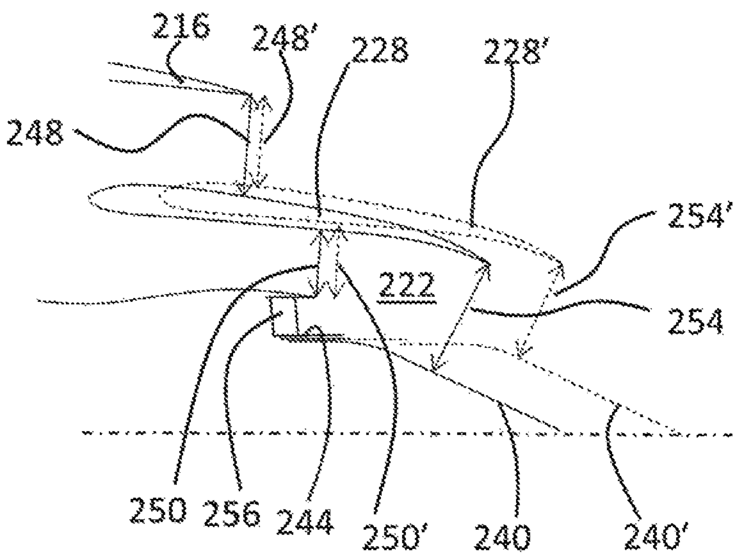
FIG. 4 shows a schematic cross-section through a first gas turbine engine, showing translating exhaust nozzle components deployed in two different positions.
Figure 5:
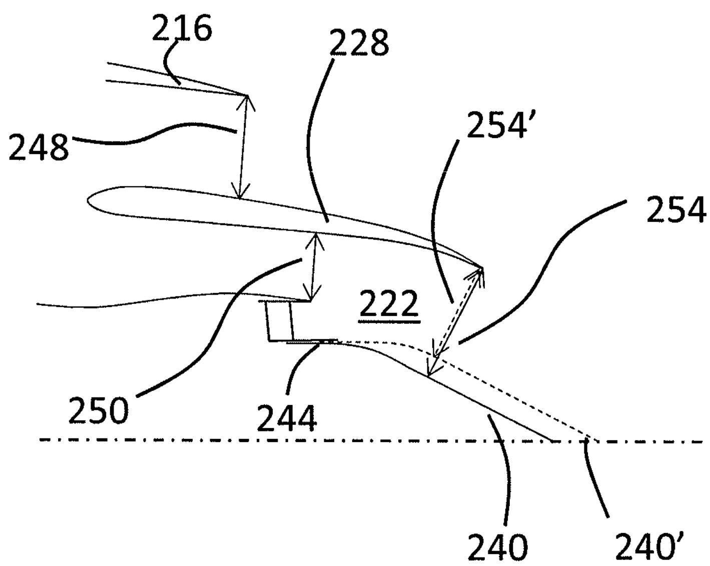
FIG. 5 shows a schematic cross-section through a second gas turbine engine, showing translating exhaust nozzle components deployed in two different positions.
Figure 6:
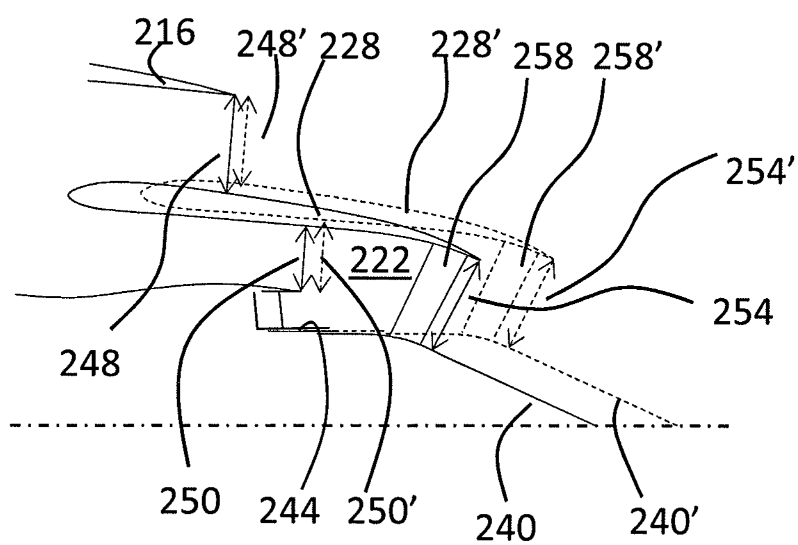
FIG. 6 shows a schematic cross-section through a third gas turbine engine, showing translating exhaust nozzle components deployed in two different positions.

FIGS. 4, 5 and 6 show schematic plots of the trailing edge of a nacelle 216, a mixer duct fairing 228 in first and second positions, a trailing edge of the core nozzle, and a tail cone 240 in first and second positions. The bypass nozzle flow area 248, mixer cold throat area 250, and the mixer duct nozzle flow area 254 are indicated by the solid and dashed lines for the first and second positions, the latter being further denoted with primed numbers. It will be noted here that the mixer duct 222 includes a chute between the tail cone 240 and mixer fairing 228 which has a convergent portion and a seemingly divergent portion. However, the reduction in mean diameter may or may not compensate for an increase in chute depth, so the minimum passage cross-section or throat plane 254 may be located at, or alternatively slightly upstream of, the exit of the mixer duct nozzle 224.

In FIG. 4, the first and second positions of the mixer fairing are displaced horizontally by approximately 5% and the first and second positions of the tail cone are displaced horizontally by approximately 10% of the outer diameter of the cold nozzle. This provides an increase of 7.5% to the total geometric flow area of the bypass duct and mixer duct nozzles when the mixer fairing 228 and tail cone 240 are retracted from the second position to the first position. This area increase can be utilised for operation at low power and low Mach numbers.

In FIG. 5, the mixer fairing 228 is retained in a fixed position, and the tail cone 240 alone is horizontally displaced by 5%. This changes the mixer duct nozzle area, but has no effect on the bypass duct nozzle area 248 or the mixer cold throat area 250. It changes the total geometric area of the bypass duct and mixer duct nozzles by about 5%, potentially increasing fan flow by a similar amount. This is a mechanically simpler arrangement, but it has less scope to vary the fan flow and may suffer increased aerodynamic losses from larger variations in Mach number in the mixer cold throat area 250.

FIG. 6 relates to another embodiment in which the mixer fairing 228 is mounted to the tail cone 240, by means of an assembly of struts or vanes 258 so as so to remove the need for the pylon support described in relation to FIG. 3. In this embodiment, there is no separate actuation for the mixer fairing 228 and it is always translated together with the tail cone 240. Here, the first and second positions for the mixer fairing 228 and tail cone 240 are displaced by 8% which results in a change of 3% in the total bypass duct and mixer nozzle areas.

Figure 7:
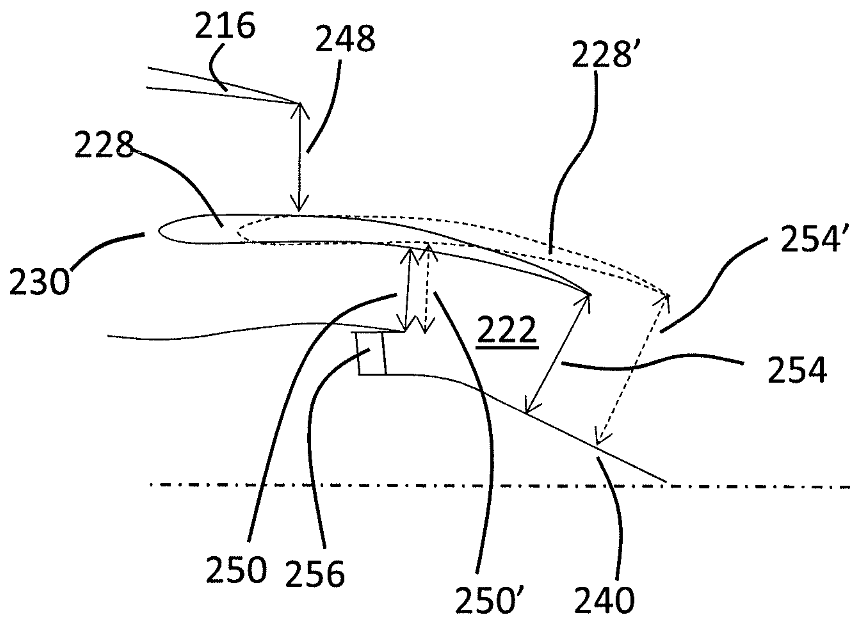
FIG. 7 shows a schematic cross-section through a fourth gas turbine engine, showing translating exhaust nozzle components deployed in two different positions.

As will be appreciated, the profiles or slopes of the mixer fairing 228 and tail cone 240 affect the rates of change of the nozzle areas with relative axial displacement. FIG. 7 shows an alternative embodiment, having a short nacelle 216 (one where the bypass duct nozzle is forwards of the last turbine stage) in which a portion of the radially outer wall of the mixer fairing 228 downstream of the leading edge 230 is substantially parallel to the axis of translation. Hence, horizontally translating the mixer fairing 228 from a first position to a second position produces no change in the bypass nozzle flow area 248, but, assuming that the tail cone is fixed, the mixer cold throat flow area 250 and mixer duct nozzle flow area 254 will change (as indicated by the primed numbers).

It will be appreciated any of the mixer fairings may have a portion of radially outer wall downstream of the leading edge 230 which is substantially parallel to the axis of translation and so translating the mixer fairing between a first and second position alters the output flow area of the mixer nozzle and moving the mixer fairing between a second and third position alters the output flow area of the bypass nozzle.

As noted with the embodiments in FIGS. 4 to 6, it is possible to have convergent-divergent nozzles, where the minimum passage cross-section or throat plane is slightly upstream of the final nozzle. Using the translating mixer fairing 228 and tail cone 240, it is also possible to make a convergent-divergent nozzle with a variable area ratio or to transition between convergent and convergent-divergent designs by translating either the mixer duct fairing 228 or the tail cone 240 or both. A convergent-divergent nozzle may give performance benefits for high cruise speed aircraft with moderately high fan pressure ratios, and it can further increase the fan nozzle effective flow area at low speeds.

Further, by appropriate annulus profiling and differential axial translations of the mixer fairing 228 and tail cone 240 it is possible to vary the area ratios of the nozzles whilst keeping the overall nozzle area constant. In this way the static pressure in the mixing plane and hence the turbine expansion ratio can be varied. This will also affect the mixed jet velocity at the exit plane, enabling the jet velocity ratios to be optimised for noise and efficiency at multiple engine conditions.

Further features may be incorporated in the mixer duct 222 and the mixer fairing 228. For example, the mixer duct 222 may incorporate cooling apparatus such as a heat exchanger which utilises at least a portion of the mixer fairing surface and bypass airflow to provide cooling. This could be utilised as a first stage of cooling the engine oil for example. In one embodiment, the surface cooler has a smooth outboard surface to minimise drag, but may incorporate surface features such as cooling fins on the inboard surface to aid cooling. The surface cooler may be formed as an integral structural element of the mixer fairing so as to aid thermal conduction and increase the cooling efficiency. Heating the smooth outer surface of the cowl will have the additional benefit of reducing the cowl drag component of the overall afterbody drag.

As will be appreciated, where the mixer fairing 228 translates forwards and aft, it will be necessary to provide flexible or telescopic connections for the fluid lines connecting the surface cooler.

In yet another embodiment, the outboard surface of the mixer fairing 228 could be fitted with an inflatable elastomeric bladder to enable a further reduction of the bypass nozzle area. Further, the mixer duct nozzle area could also be reduced by means of a bladder or other moving surface on the inboard side of the mixer fairing 228. In other embodiments, the invention could be combined with other known means of varying the external diameter and exit flow area or shape of the bypass nozzle in order to provide a larger area variation or to provide noise suppression or both as described for example in GB2374121.

In use, the axial displacements of the mixer fairing 228 and tail cone 240 are controlled by the engine control system to provide optimal nozzle flow areas according to the engine's operating condition and flight environment. The fan exit nozzle areas may be set to be the minimum required to give safe margins against fan surge and fan flutter as appropriate to the operating condition. For example the fan exit nozzle areas could be maximised at takeoff where the low air speed and cross-winds have the greatest potential to compromise fan surge margin. At other operating conditions the fan exit nozzle areas may be optimised to minimise fuel burn or engine operating temperatures or shaft speeds or noise. For example, the final nozzle areas may be minimised at top of climb, maximised at take-off and low power conditions and have intermediate flow areas at cruise. Generally, the output flow area of the bypass nozzle and the output flow area of the mixer nozzle may be reduced with an increase in fan speed.

Figure 8:
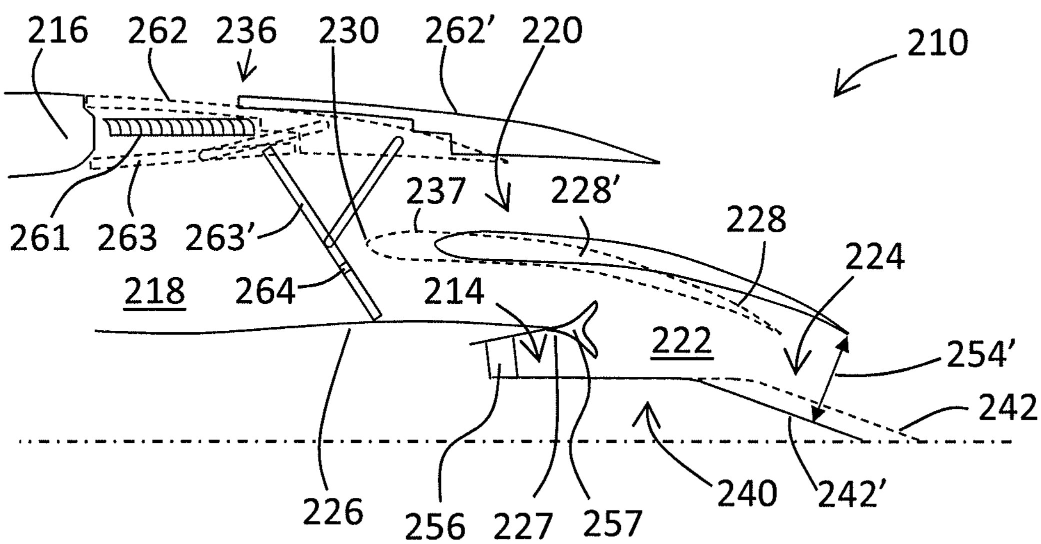
FIG. 8 shows a schematic cross-section through a fifth gas turbine engine, showing exhaust nozzle components and a deployed cascade type thrust reverser.

FIG. 8 shows a thrust reverser in the form of cascade thrust reverser assembly 236 which is incorporated into the nacelle 216 of the engine 210. In reverse thrust operation the cascades 261 are exposed by translation of the aft part 262 of the nacelle 216 to a further aft position 262' and by movement of blocker doors 263 from their normal stowed positions to their deployed positions 263'. The deployment of the blocker doors 263 substantially blocks-off the aft end of the bypass duct 218, diverting the majority of the bypass air flow through the cascades 261 to provide reverse thrust.

FIG. 8 shows the deployed blocker doors 263' close to the core fairings 226 which restricts flow through the mixer duct 222 to the mixer nozzle 224. When bypass airflow into the mixer duct 222 is reduced in reverse thrust operation, the static pressure at the core nozzle 214 is reduced, increasing the expansion ratio across the turbines and the work transferred to the fan. At the same time the reduction in airflow through the mixer duct nozzle 224 reduces its exhaust velocity and reduces the residual forward thrust from the core engine, increasing the net reverse thrust. This benefit relative to conventional separate jet engines can be enhanced by maximising the mixer duct nozzle area 254 by either or both of translating the mixer fairing 228 to its aftmost position 228' and retracting the convergent portion 242 of the tail cone 240 to its furthest forward position 242'.

In alternative embodiments the deployed blocker doors 263' might form a restriction with, or seal against, the outer surface 237, or the leading edge 230, of the mixer fairing 228 and allow some bypass air to flow through the mixer duct 222. This can be beneficial if the mixer fairing incorporates a heat exchanger and needs to be protected from the hotter core exhaust gasses emerging from the turbine outlet guide vanes 256.

The blocker door 263 includes a plurality of apertures 264 in an upstream flow path relative to the leading edge of the mixer fairing 228. The apertures 264 allow a flow of cooling air to pass-over the leading edge and around the mixer fairing 228 to provide cooling during reverse thrust operation. Such cooling may be necessary in lieu of the blocked bypass air which would ordinarily cool the mixer duct, and to help reduce the ingestion and heating effect of the core exhaust which may otherwise be drawn upstream in the mixer duct and around and outboard of the mixer fairing 228. The cooling may be in the form of discrete jets impinging on the leading edge 230 of the mixer fairing 228 or a diffused flow depending on the configuration and position of the holes 264 relative to the mixer fairing 228.

It will be appreciated that alternative thrust reverser designs may be substituted for the fixed cascade reverser, including, but not limited to, translating cascade reversers and pivot door reversers.

Figure 9:
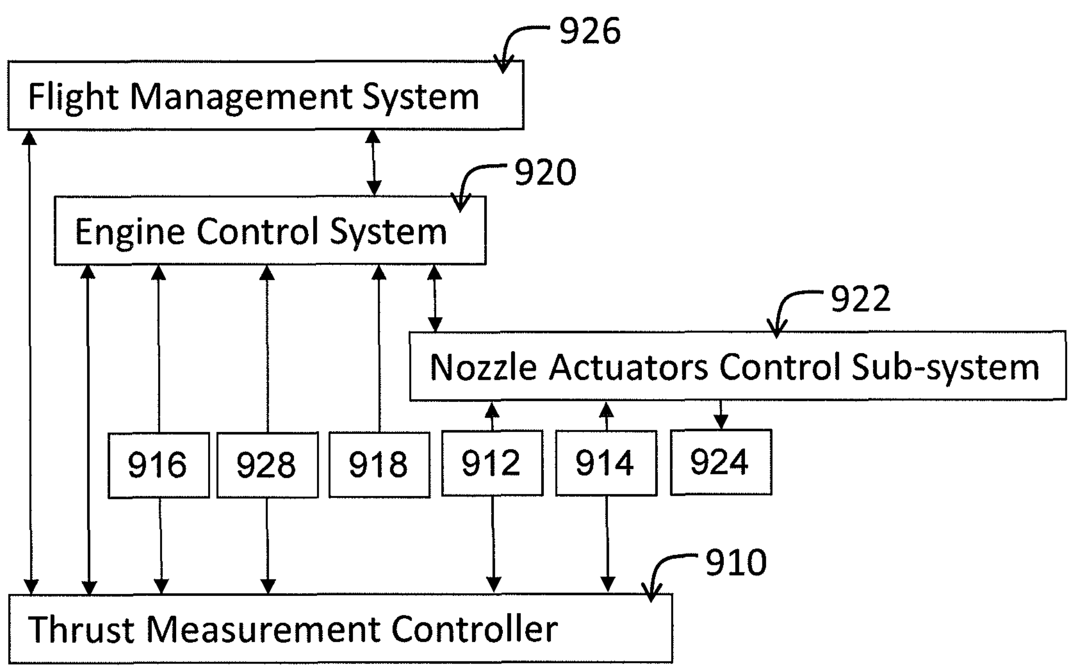
FIG. 9 shows a simplified schematic diagram of thrust measurement and control apparatus for use with the translating exhaust nozzle components.

FIG. 9 shows a schematic diagram of parts of possible thrust measurement and control systems for the translating mixer fairing and for the tail cone if this is also independently moveable.

The thrust measurement system includes a processor 910 which may be part of a larger engine control system 920. The thrust measurement processor 910 is arranged to receive signals from sensors 912, 914 which detect and provide signals indicative of either or both of the positions of the mixer fairing 228 and tail cone 240, and a sensor 928 which indicates the state of the thrust reverser, and signals from other sensors 916 that for example measure engine pressures, temperatures and shaft speeds to enable the thrust to be accurately determined. The thrust measurement processor 910 may also take aircraft operating conditions as inputs. The thrust measurement processor 910 may be configured to determine the thrust being provided by the engine at any given time.

It will be appreciated that the sensors 912, 914 may also be used to provide a signal to a separate actuator control sub-system 922 which may control the actuators 924 which position the mixer fairing 228 and tail cone 242, and confirms correct operation and deployment of these components.

The control of the actuators may be achieved by algorithms taking indications of engine and/or aircraft operating conditions as inputs provided by the engine control system 920 and flight management system 926. Alternatively the control of fan surge or flutter margin may be achieved using feedback from sensor systems 918 designed to sense the onset of surge or levels of fan vibration. The vibration may be indicative of a systems failure or incipient systems failure, or detection of actual or potential damage to the fan from a bird-strike or other foreign object impact. When increased vibration or fan surge is detected, the output flow area of the bypass nozzle and the output flow area of the mixer nozzle can be increased. An over-riding command to maximise nozzle areas could also be provided by the pilots or by a flight management system 926 in order to respond to abnormal conditions, such as operation following a bird-strike, engine surge or other event.

In an aircraft that features multiple engines with shaft speed synchronisation and/or synchrophasing to control especially the noise produced by multiple fans, the engine control system 920 may also command the actuator control sub-system 922 to harmonize the control of nozzle areas between different engines. Typically this would be achieved by designating one engine as the master and with limited authority commanding the other engine or engines to match its operating parameters. These parameters may include positioning of the mixer fairing 228 and tail cone 240.

The above described embodiments are examples of the invention defined by the claims and should not be taken to be limiting. For example, although the mixer fairing 228 is shown as having a continuous circumferential radius at each axial point (with the exception of where it joins the pylon 253) the annulus may include lobes or undulations to aid mixing of the various airstreams. The trailing edge 232 of the mixer fairing 228 may also be serrated to aid mixing and reduce noise. FIG. 8 shows a lobed or forced mixer 257 that may be attached to the trailing edge 227 of the core fairing 226 to enhance mixing of the hot and cold airstreams.

Where possible, features described as part of a particular embodiment should not be taken to be limited as being used with that embodiment only, with the possibility of incorporation with other embodiments contemplated where possible.

The invention claimed is:

1. A gas turbine engine comprising:

a bypass duct having a bypass nozzle;

an engine core having a core nozzle;

a pylon which is attached to the wing or airframe of an aircraft;

a mixer fairing defining a mixer duct having a mixer duct inlet and a mixer nozzle, the mixer fairing is movably mounted to mounting rails on each side of the pylon; and a tail cone, wherein the mixer duct is arranged to receive an airflow from the bypass duct through the mixer duct inlet and an airflow from the engine core, when in use, and a geometry of the mixer duct is selectively adjustable by moving the mixer fairing relative to the bypass duct and engine core in use, the mixer fairing is movable by a first amount between a first mixer fairing position and a second mixer fairing position which simultaneously alters one or more of: an output flow area of the bypass nozzle, an output flow area of the mixer nozzle, and, a throat area of the mixer duct inlet, such that the respective in use airflows are altered, and the tail cone is movable by a second amount, different than the first amount, between a first tail cone position and a second tail cone position.

2. A gas turbine engine as claimed in claim 1, wherein moving the mixer fairing between the first and second mixer fairing position alters all of: the output flow area of the bypass nozzle, the output flow area of the mixer nozzle, and, the throat area of the mixer duct inlet.

3. A gas turbine engine as claimed in claim 1, wherein a portion of radially outer wall of the mixer fairing downstream of a leading edge is substantially parallel to an axis of movement such that moving the mixer fairing between the first and second mixer fairing positions alters the output flow area of the mixer nozzle and moving the mixer fairing between the second mixer fairing position and a third mixer fairing position alters the output flow area of the bypass nozzle and mixer nozzle.

4. A gas turbine engine as claimed in claim 3, wherein moving the mixer fairing between the second and third mixer fairing positions additionally alters the mixer duct inlet flow area.

5. A gas turbine engine as claimed in claim 1, wherein the mixer fairing is axially translatable relative to a principal axis of the gas turbine engine so as to alter the geometry of the mixer duct.

6. A gas turbine engine as claimed in claim 1 wherein the core nozzle exits directly into the mixer duct.

7. A gas turbine engine as claimed in claim 1 wherein a leading edge of the mixer fairing is at least partially located within the bypass duct in the first and second mixer fairing positions.

8. A gas turbine engine as claimed in claim 1 wherein either or both of the mixer fairing and the trailing edge of a core fairing includes lobes to aid mixing of a engine core airflow and bypass airflow.

9. A gas turbine engine as claimed in claim 1 wherein the mixer fairing and tail cone are configured to move simultaneously.

10. A gas turbine engine as claimed in any of claim 1 wherein a portion of the mixer duct is defined by the tail cone and the mixer duct fairing which are arranged to have a chute therebetween, the minimum flow area of which is adjustable with the movement of the mixer fairing.

11. A gas turbine engine as claimed in claim 1, wherein at least a portion of the mixer fairing exchanges heat between a bypass airflow exiting the bypass nozzle and an airflow passing through the mixer duct.

12. A gas turbine engine as claimed in claim 1, further comprising a thrust reverser having at least one door which is operable to substantially block the bypass duct in a thrust reversing operation, wherein the door includes at least one aperture in an upstream flow path relative to a leading edge of the mixer Fairing such that the leading edge of the mixer fairing is provided with a cooling air flow when the thrust reverser door is deployed.

13. A gas turbine engine as claimed in claim 1, further comprising a thrust measurement system and at least one sensor operably connected to the thrust measurement system, wherein the sensor is configured to provide the thrust measurement system with a signal which is representative of the position of the mixer fairing.

14. A gas turbine engine as claimed in claim 13, further comprising a tail cone position sensor.

15. A gas turbine engine as claimed in claim 1, an engine control system and at least one sensor operably connected to the engine control system, wherein the sensor is configured to provide the engine control system with a signal which is representative of the position of the mixer fairing.

16. A gas turbine engine as claimed in claim 15, wherein the engine control system reduces the output flow area of the bypass nozzle and the output flow area of the mixer nozzle with an increase in fan speed of a main propulsive fan of the gas turbine engine.

17. A gas turbine engine as claimed in claim 1, wherein the first amount and the second amount are in an axial direction of the gas turbine engine.

18. A gas turbine engine as claimed in claim 1, wherein the mixer fairing includes a gap that circumferentially splits the mixer fairing at the pylon, and the gas turbine engine further including the mounting rails on each side of the pylon that connect the mixer fairing to the pylon, the mounting rails being configured to allow the mixer fairing to move relative to the pylon.

* * * * *